United States Patent [19]

Anderson

[11] Patent Number: 4,650,571
[45] Date of Patent: Mar. 17, 1987

[54] AUTOMATIC INDEXER FOR INDUSTRIAL FILTERS

[75] Inventor: Raymond L. Anderson, Dearborn Heights, Mich.

[73] Assignee: H. R. Black Company, Warren, Mich.

[21] Appl. No.: 802,667

[22] Filed: Nov. 29, 1985

[51] Int. Cl.[4] .................... B01D 35/00; B01D 29/02
[52] U.S. Cl. ........................................ 210/86; 210/90; 210/91; 210/137; 210/138
[58] Field of Search ............... 210/104, 122, 113, 137, 210/86, 138, 90, 91

[56] References Cited

U.S. PATENT DOCUMENTS 2,867,325  1/1959  Hirs ..................................... 210/138
3,939,796  2/1976  Smith et al. ........................... 210/90
4,054,521  10/1977 Winzen ................................. 210/137

Primary Examiner—Richard V. Fisher
Assistant Examiner—Linda S. Evans
Attorney, Agent, or Firm—Cullen, Sloman, Cantor, Grauer, Scott & Rutherford

[57] ABSTRACT

In an industrial filter apparatus having a tank with an inlet receiving contaminated effluent from an industrial washing device and a discharge outlet connected to the washing device for recirculating washing fluids, a continuous filter spanning the tank interposed between the inlet and outlet, a continuous drive connected to the filter, a motor connected to the drive and a pump delivering filtered fluids from the outlet to the washing device, an automatic filter media indexer comprises a sensing arm rotatably journaled upon the tank having a contactor engagable with the filter on its downstream side connected by a link and a pull rod to a normally open switch connected to a power source and to the motor. A switch actuator on the pull rod is in registry with the switch, and an adjustable spring normally biases the pull rod. The differential between the liquid levels upon opposite sides of the filter increasing to a predetermined level as it becomes clogged, effecting a proportional deflection of the filter and causing movement of the sensing arm to close the switch.

16 Claims, 4 Drawing Figures

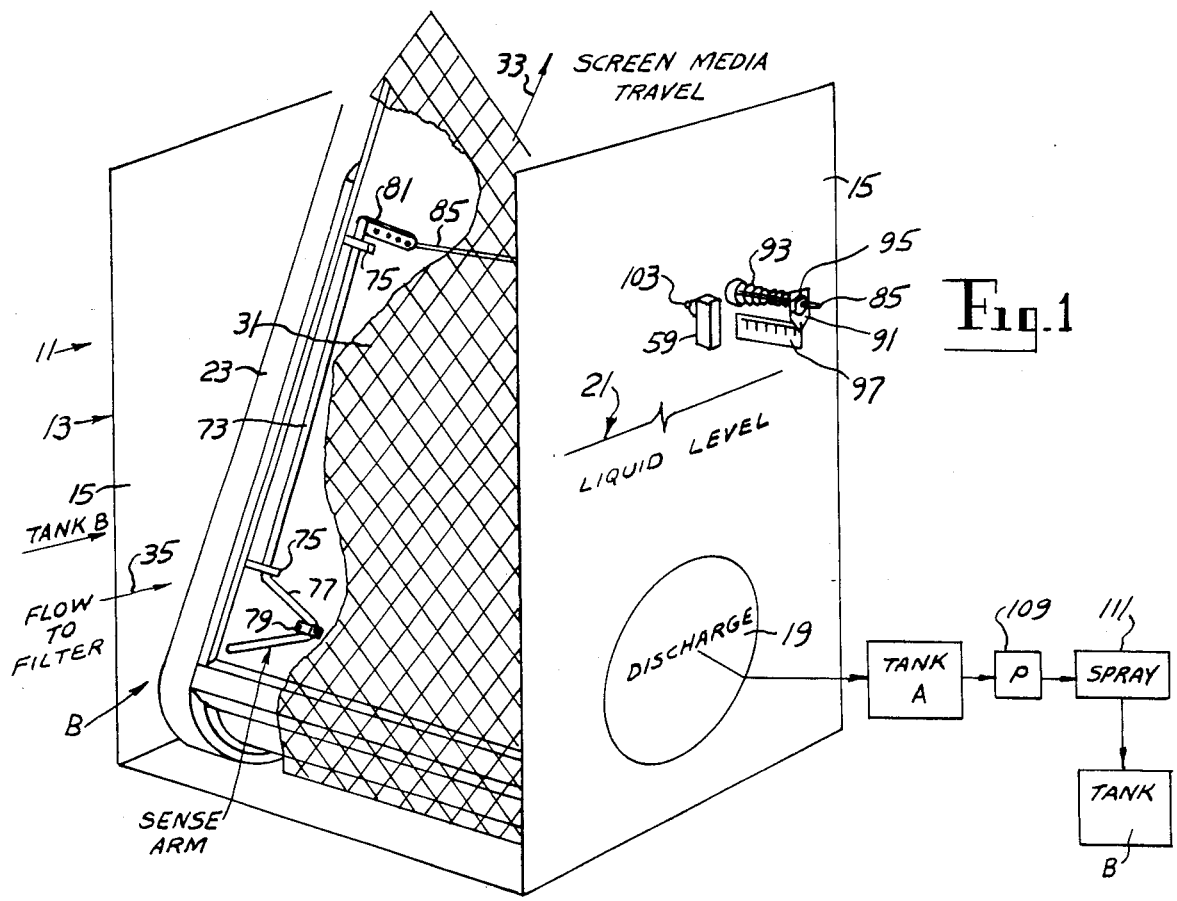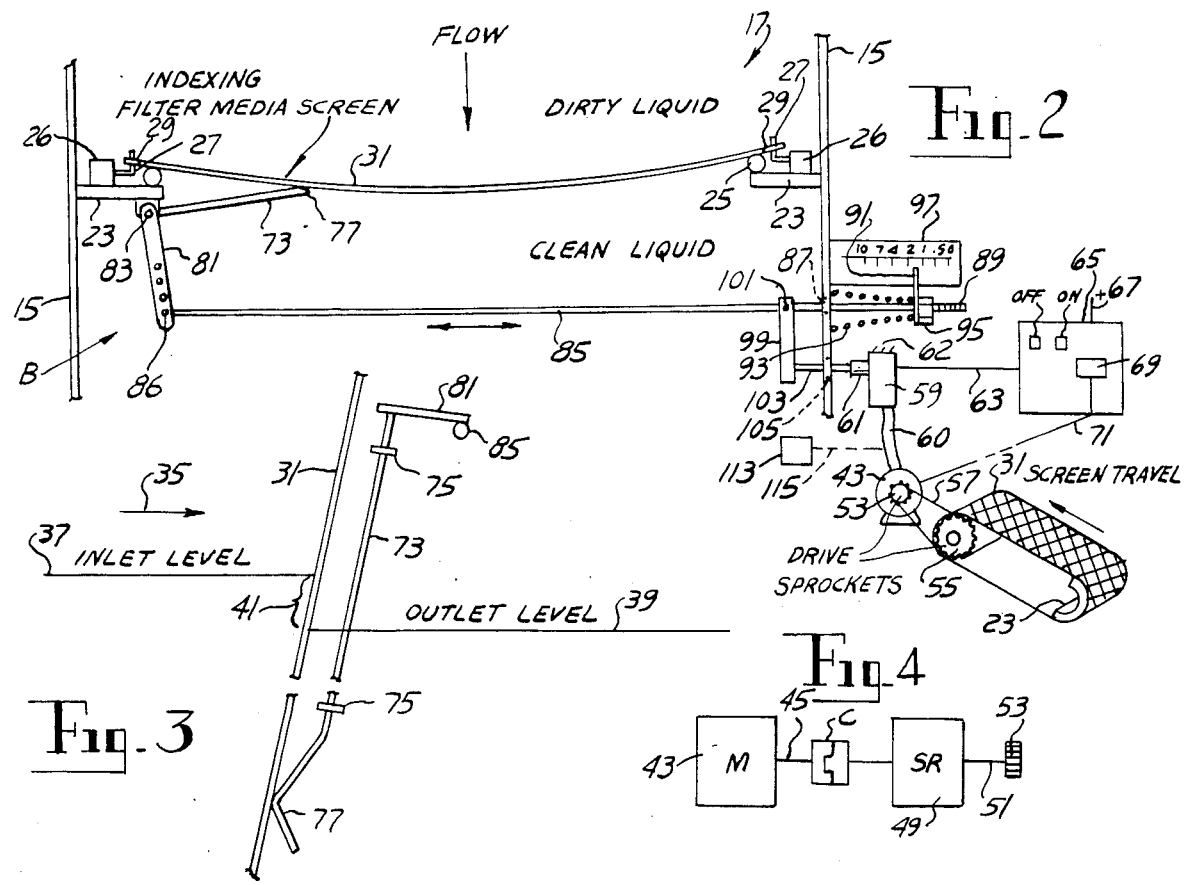

AUTOMATIC INDEXER FOR INDUSTRIAL FILTERS

This invention relates to Industrial Filter Apparatus, and more particularly to an automatic filter indexing mechanism therefore.

BACKGROUND OF THE INVENTION

Most indexing type industrial filtration machines sometimes use elaborate level sensing techniques to trigger the filter indexing mechanism. These elaborate systems are prone to failure because of the working environment of an industrial filter machine, which is usually very dirty and hostile toward sensitive equipment.

Most level sensing systems compare the inlet flow level to the outlet flow level. When the outlet flow level differs from the inlet level, it is because the filter media is loaded and restricting flow, and new media is needed.

Many of these level sensing systems use sensitive pneumatic circuits which are expensive, require considerable maintenance and oftentimes are too difficult for an average industrial worker to quickly diagnose.

SUMMARY OF THE INVENTION

An important feature is to provide an automatic filter indexer which is designed to be the simplest and most straight forward method of detecting the differential across an operating filter media. It is all mechanical, and so simple as to be almost foolproof.

Another feature is to provide a method which uses the filter media itself as a large diaphragm, sensing the tension against it caused by flow restriction. This flow restriction causes the liquid level on the outlet side of the screen to lower because the spent media will not admit clean liquid fast enough to satisfy system flow. This causes the media itself to act as a dam, holding back the flow, and causing an easily detectable tension on the media.

Another feature of the present invention is to provide an arm to contact the media on the downstream side and is situated such that the tension on the media is mechanically transmitted to a remote sensor.

As an important feature, since the force transmitted varies directly with the detected differential, the force is measured using a simple calibrated spring and scale. The spring is situated to counterbalance the tension of the media, and to close an electrical switch. With this method, the spring tension is adjusted to hold the electrical switch in the "OFF" position until the tension of the media reaches a predetermined level. Once this predetermined level is reached, the counterbalance spring begins to compress and the switch is activated. The spring's length under compression is used to gauge the amount of differential pressure present.

Another feature is using a scale. The user adjusts the spring tension until the integral pointer indicates the desired "Trigger Point". The pointer will not move unless this preset level is exceeded.

As another feature when the present level is exceeded, the indexing mechanism is activated. If the differential becomes greater still, the pointer will move to indicate the actual differential. If the differential is relieved, as it should after indexing, the switch is deactivated. The switch is very sensitive and normally the pointer movement will be barely perceived. If the pointer leaves its normal position by a great amount, it shows visually that the filter is experiencing an overload.

As another feature, the media may be a stationery pull out replaceable filter and wherein the sensor used provides an audible alarm indicating that the filter is dirty and should be replaced. In this situation no indexer is employed or any indexer feed motor.

These and other features and objects will be seen from the following specification and claims in conjunction with the appended drawing.

THE DRAWING

FIG. 1 is a fragmentary perspective partly schematic view of an industrial filter apparatus employing the present automatic indexer.

FIG. 2 is a fragmentary plan view thereof, partly schematic in showing the connection of the sensor assembly with the filter media feed.

FIG. 3 is a schematic elevational view of the filter indexing sensor assembly of FIG. 2.

FIG. 4 is a schematic diagram showing the connection between the motor and a speed reducer for intermittently indexing the filter media.

It will be understood that the above drawing illustrates merely a preferred embodiment of the invention, and that other embodiments are contemplated within the scope of the claims hereafter set forth.

DETAILED DESCRIPTION OF AN EMBODIMENT OF THE INVENTION

Referring to the drawing, industrial filter apparatus employing the present automatic filter media indexer is generally indicated at 11, FIG. 1, which is a fragmentary perspective view and partly schematic and includes a housing 13 including a pair of opposed side walls 15 defining tank B. Tank B includes within said housing in one of the side walls 15 a discharge outlet 19 which is normally arranged below the general liquid level 21, schematically shown.

A pair of laterally opposed spaced sprocket chain tracks or guides 23 are mounted upon the interior of the side walls 15 and mount along their inner edges the continuous screen seal rods 25, FIG. 2. A pair of opposed continuous sprocket chains 26 are schematically shown in FIG. 2, as guidably positioned over and around the respective tracks 23 in a conventional manner. Each of the sprocket chains includes longitudinally spaced upright hooks 27 adapted to receive corresponding longitudinally spaced grommets 29 along the opposite margins of the indexable filter media or screen 31.

In the illustrative embodiment, screen travel is designated by the arrow 33, FIG. 1, with fluid flow inlet to tank B designated at 35, FIG. 1, and with fluid outlet through discharge outlet 19. FIG. 3 schematically illustrates the normal inlet level at 37 of dirty fluids from a washing device or spray apparatus such as shown at 111, FIG. 1. The drainage from washing apparatus 111 flows to tank B, shown by the block, FIG. 1. This block furthermore corresponds to the tank B with inlet at 17 in FIG. 2.

The washing apparatus contemplated may be in the form of a power spray washer such as used for detergent cleaners, alkali cleaners, emulsion cleaners, iron phosphate cleaners, rinse solutions and zinc phosphate solutions. The filter apparatus may be used for paint spray booths, water test booths, grinding, lapping honing, baking pan washers, bottle washers, water cooling towers and sewage effluent.

In normal operation, filtered fluid discharges at 19 and flows into tank A, from which the fluid is pumped as at 109 to a spray apparatus 111. This may be one of the forms of washing devices for equipment that moves therethrough for cleaning on a conveyor or the like. Effluent with accumulated dirt or particles thereon flows into tank B for communication to the inlet side of housing 13, FIG. 1.

As the filter media 31 becomes dirty or partly dirty due to particles caught by the filter media, there will be a differential 41 between the inlet level 37 and outlet level 39 as in FIG. 3, due to lowering of level 39.

Apparatus for feeding the filter media 31 includes an electric motor 43 having a drive shaft 45, FIG. 4, connected to a clutch or flexible coupling C and to speed reducer 49 whose drive shaft 51 mounts drive sprocket 53. The filter drive sprocket 55 is connected to drive sprocket 53 by a conventional sprocket chain 57 effecting intermittent indexing or feed movements of filter screen or media 31 as it extends around a suitable support and including the guides or tracks 23, schematically shown in FIGS. 1 and 2.

Mounted upon the exterior of one side wall 15 at 62 is a normally open motor control switch or limit switch 59, connected to motor 43 by power leads 60.

Switch 59 has a normally retracted switch contact 61, FIG. 2, which is connected by lead 63 to control panel 65 having a power source 67, schematically shown. On panel 65 is an OFF switch and an ON switch. The control panel includes mounted thereon a timer 69 which may be preset for closing every 30 minutes and through a power lead 71 is adapted to energize motor 43 regardless of and independent of the automatic indexing mechanism. The purpose of the timer is to activate motor 43 every 30 minutes, for example, for a period of 10 seconds, approximately, in order to keep the sprocket chains 26 loose and to prevent drying of dirt upon the media.

The timer may be preset for a different period for operation and for automatic reset. The operation of the timer is independent of the filter media indexer which is automatic in the sense that it advances the filter media from time to time depending upon the dirt build-up thereon and depending upon the differential 41 established between the inlet and outlet levels 37 and 39, FIG. 3. While the media 31 is shown generally upright in FIG. 1, said media could be in any other position such as horizontal.

The present filter media indexing device includes an elongated sense arm 73 which is rotatably adjustable upon its longitudinal axis and is supported and journaled by a pair of longitudinally spaced arm supports or brackets 75. Said brackets are mounted upon one of the tracks 23 or corresponding side wall 15, FIGS. 1 and 2.

Arranged upon one end of sense arm 73 is a laterally offset screen contactor 77 of substantially V-shape. Said contactor is adapted to engage a portion of the filter media or screen 31 intermediate its sides downstream of the filter, FIG. 2. A roller 79, FIG. 1, may be mounted at the apex of contactor 77 for cooperative engagement with the downstream side of filter media 31.

Pivot link 81 is secured at 83 to sense arm 73, such as at one end thereof, and is adapted for rotatable adjustment therewith. The free end of pivot link is apertured at 86 and adapted to receive a right angular one end of pull rod 85 for an adjustable connection therewith and for supporting one end of pull rod 85. The other end of the pull rod extends through an aperture or guide 87 within the opposed side wall 15, FIG. 2, and terminates outwardly of said sidewall in a threaded portion 89.

Pointer 91 and the coiled calibrated spring 93 are mounted upon the extended end portion 89 of pull rod 85 on the exterior of side wall 15 and adjustably secured in position by the nut or adjustable stop 95. Adjustment of nut 95 is adapted to regulate the initial compression of coiled spring 93.

Pointer 91 preferably connected to one end of said spring is adapted for registry with the elongated scale 97 calibrated in inches as between 0 and 10 inches, for illustration, or other indicia.

Transverse switch actuator 99 is adjustable secured at 101 upon an end portion of pull rod 85 upon the interior of the adjacent side wall 15 and includes an actuator pin 103 which extends through a corresponding aperture in sidewall 15 and is in alignment or in registry with switch contact 61. Pin 103 is normally adapted to hold said contact in a retracted position normally maintaining switch 59 open with respect to the power source 65, 67, and lead 63, so that motor 43 is inoperative.

The compression of spring 93 is adjusted so as to bias actuator pin 103 to maintain switch 59 open, and at the same time bias the sensor contactor 77 against filter 31.

For normal operation of the present indexing device and the filter apparatus shown at 11, there must be a continuous flow of fluids such as dirty fluid or partly contaminated liquids from the spray or other cleaning apparatus 111 into tank B. This corresponds to inlet 17 of housing 13 by which the contaminated fluids such as water or the other chemical is introduced to filter screen 31 on the upstream side. This is at the inlet level 37, FIG. 3, over an area corresponding substantially to the width of filter media 31.

With the pump 109 continuously pumping filtered liquids to the spray apparatus 111, the contaminated fluids flow into tank B. As the filter media becomes partly clogged with dirt or other particles passing from the spray apparatus 111, there will be such gradual build-up of dirt or cake upon the filter media upstream side, which acts as a diaphragm and which gradually reduces the flow of fluids through the media so that there results an outlet level 39 at a differential 41 with respect to the inlet level 37. The outlet level gradually falls.

With such differential at 41, there will be a corresponding but limited deflection of the media 31 in the downstream direction to operatively engage the contactor 77 of the sense arm 73 causing a limited clockwise rotation thereof, FIG. 2. This rotation produces a corresponding limited clockwise rotation of link 81 and a corresponding longitudinal movement of pull rod 85 to the left, FIG. 2. This disengages actuator pin 103 from switch element 61 automatically closing switch 59. This movement acts against and compresses spring 93.

This provides power to lead 60 and to motor 43 and the motor is activated for an incremental feed of filter media 31 in the direction shown in FIGS. 1 and 2. When a portion of the screen is reached which is less obstructive to the inlet fluids, the differential 41 will be reduced such sufficient amount that the filter media 31 returns to its initial position and there is a corresponding longitudinal movement of pull rod 85 to the right, FIG. 2, under the action of spring 93, such that switch 59 is deactivated and the motor 43 stops.

Thus compression spring 93 is initially biasing pull rod 85 to the right, FIG. 2, so that the sense arm 73, 77 yieldingly bears against the media 31 on the downstream side thereof.

In normal operation with the pump 109 energized to provide a continuous flow of fluids into tank B, it is contemplated that there will be before deflection of the media 31 some limited build-up of dirt particles which further improves the efficiency of the filter media or screen holding back smaller particles which might otherwise pass through the perfectly clean media.

However, after a certain particular point of build-up of dirt upon the media restricting the flow of fluid therethrough, there will be a build-up of such sufficient differential 41 between the inlet and outlet levels 37, 39, FIG. 3, as will cause a deflection of the media 31 downstream, rotating the sensing arm and connected link 81 in a clockwise direction.

As shown in FIG. 2, there are a series of pull rod connector apertures 86 along the length of link 81 to provide for such adjustment as may be needed and wherein there is provided a support for one end of pull rod 85 within and transversely of tank B.

Instead of the mechanical type of limit switch 59, shown in FIG. 2, there could be employed an inductive non-contacting type switch that senses the presence of the pointer 91. In that case, the switch position may be adjusted instead of the spring tension. In all events, when there is such build-up of contamination or dirt upon the upstream side of the filter media 31 and such predetermined differential as at 41 between inlet and outlet fluid levels 37, 39 the sensor will nevertheless respond to a corresponding deflection of the filter media such as will move the pull rod 85 and activate the switch 59 or equivalent noninductive non-contacting type of switch to energize motor 43.

MODIFICATION

As a modification of the present invention, instead of a continuous filter media, such as shown at 31 in FIGS. 1 and 2, there may be a unit filter employed having a plurality of grommets along its opposite edges and which are removably positioned and anchored over suitable stationary hooks 27, FIG. 2. From time to time the filter element 31 may be removed and replaced with a clean filter.

The present invention would operate substantially the same except that no motor is required or sprocket chains driven thereby. Switch 59 when closed is adapted to energize an audible alarm 113, FIG. 2, connected at 115 to switch lead wires 60. When a predetermined differential 41 is reached, there will be an audible alarm. The filter apparatus is shut down long enough to permit removal of the dirty filter screen and its replacement with a clean filter screen and the apparatus reactivated. Thus, the sensor is used to provide an alarm as schematically shown at 113.

Having described my invention, reference should now be had to the following claims:

I claim:

1. In an industrial filter apparatus having a tank with an inlet receiving contaminated effluent from an industrial washing device and a discharge outlet adapted for connection to said washing device for recirculating washing liquid, a continuous flexible filter media spanning the interior of the tank, movably mounted thereon and interposed between said inlet and outlet, a continuous drive means mounted upon said tank and connected to said media, a motor drivingly connected with said drive means, and a pump for continuously pumping filtered liquid from said outlet to said washing device, the liquid passing through said tank having inlet and outlet levels upon opposite sides of said media;

an automatic filter media indexing device comprising a sensing arm rotatably journaled upon said tank having a contactor engagable with said filter media on the downstream side thereof;

a transverse pull rod mounted within and upon said tank;

a link interconnecting said sensing arm and pull rod, at one end affixed to said sensing arm and rotatable therewith and at its other end pivotally connected to said pull rod;

a normally open switch connected to a power source and to said motor;

a switch actuator mounted upon said pull rod and in registry with said switch;

and an adjustable spring means normally biasing said pull rod for yieldably maintaining said sensing arm against and responsive to deflection of said filter media, and maintaining said actuator against said switch;

the differential between said liquid levels increasing to a predetermined level as the media becomes clogged, effecting a proportional deflection of said filter media and causing movement of said sensing arm and pull rod closing said switch.

2. In the filter media indexing device of claim 1, said other end of the link defining an aperture for receiving one end of said pull rod, rotating movements of said link effecting longitudinal movements of said pull rod.

3. In the filter media indexing device of claim 1, said tank including spaced side walls, said sensing arm being journaled upon one of said side walls, said pull rod at one end slidably projecting through the other side wall, the other end of said link supporting the other end of said pull rod.

4. In the filter media indexing device of claim 1, said tank inlet being substantially coextensive laterally with the width of said filter media.

5. In the filter media indexing device of claim 1, said contactor being laterally offset from said sensing arm adjacent one end thereof.

6. In the filter media indexing device of claim 1, said contactor being laterally offset from said sensing arm and engagable with said filter media intermediate its sides.

7. In the filter media indexing device of claim 1, outer portions of said link having a series of longitudinally spaced apertures therethrough for adjusting the connection of said pull rod thereto.

8. In the filter media indexing device of claim 1, said tank including a pair of side walls, said pull rod at one end slidably projecting through and outwardly of one side wall;

an adjustable stop threaded onto said one end of said pull rod;

and a coil spring mounted on the projecting end of said pull rod and interposed in compression between said one side wall and said stop;

adjustment of said stop adapted to regulate the compression of said spring for balancing said sensing arm for presetting and adjusting said differential at which said pull rod will actuate said switch.

9. In the filter media indexing device of claim 8, means for adjusting the spring tension to hold said switch in an off position until tension applied to the filter media due to said differential reaches a predetermined level.

10. In the filter media indexing device of claim 8, a scale calibrated in inches mounted upon said one side wall adjacent said spring;

and a pointer adjacent said stop in registry with said scale;

said stop adapted to adjust the spring tension until said pointer indicates a desired "trigger point" on said scale, the pointer remaining stationery until said preset level is exceeded.

11. In the filter media indexing device of claim 1, said tank including spaced side walls, said pull rod at one end projecting through one side wall;

said switch being mounted upon the outside of said one side wall;

said switch actuator including a pin projecting through said one side wall engagable with said switch.

12. In the filter media indexing device of claim 1, said power source including a control panel having a first lead connected to said motor;

a preset timer switch upon said control panel connected to said power source;

and a second power lead interconnecting said timer switch and said motor, for intermittently energizing said motor indexing said media for a limited period independent of said filter media indexing device, to keep said drive means loose and to prevent drying of dirt accumulated upon said media.

13. In the filter media indexing device of claim 5, a roller journaled upon said contactor in registry with said filter media.

14. In an industrial filter apparatus having a tank with side walls, an inlet receiving contaminated effluent from an industrial washing device and a discharge outlet adapted for connection to said washing device for recirculating washing liquid, spaced opposed continuous tracks upon said side walls, a continuous flexible filter media spanning and movably mounted upon said tracks interposed between said inlet and discharge outlet, a continuous sprocket chain movably mounted upon said tracks and connected to said filter media, a motor drivingly connected with said sprocket chain, and a pump for continuously pumping filtered liquid from said outlet to said washing device, the liquid passing through said tank having inlet and outlet levels upon opposite sides of said filter media;

an automatic filter media indexing device comprising a sensing arm rotatably journaled upon one side wall having an offset contractor engagable with said filter media on the downstream side thereof;

a transverse pull rod at one end projecting through a side wall;

a link interconnecting said sensing arm and pull rod, at one end affixed to said sensing arm and rotatable therewith and at its other end pivotally connected to and supporting the other end of said pull rod;

a normally open switch connected to a power source and to said motor;

a switch actuator connected to said pull rod and in registry with said switch;

and an adjustable spring means normally biasing said pull rod for yieldably maintaining said sensing arm against and responsive to deflection of said filter media, and said actuator against said switch;

the differential between said liquid levels increasing to a predetermined level as the media becomes clogged, effecting a proportional deflection of said filter media and causing movement of said sensing arm closing said switch.

15. In an industrial filter apparatus having a tank with an inlet receiving contaminated effluent from an industrial washing device and a discharge outlet adapted for connection to said washing device for recirculating washing liquid, a flexible filter media spanning the interior of the tank, removably mounted thereon and interposed between said inlet and outlet, and a pump for continuously pumping filtered liquid from said outlet to said washing device, the liquid passing through said tank having inlet and outlet levels upon opposite sides of said media;

an automatic filter media signal device comprising a sensing arm rotatably journaled upon said tank having a contactor engagable with said filter media on the downstream side thereof;

a transverse pull rod mounted within and upon said tank;

a link interconnecting said sensing arm and pull rod, at one end affixed to said sensing arm and rotatable therewith and at its other end pivotally connected to said pull rod;

an audible alarm;

a normally open switch connected to a power source and to said alarm;

a switch actuator mounted upon said pull rod and in registry with said switch;

and an adjustable spring means normally biasing said pull rod for yieldably maintaining said sensing arm against and responsive to deflection of said filter media, and maintaining said actuator against said switch;

the differential between said liquid levels increasing to a predetermined level as the filter media becomes clogged, effecting a proportional deflection of said filter media and causing movement of said sensing arm and pull rod closing said switch energizing said alarm to permit replacement of filter media.

16. In an industrial filter apparatus having a tank with an inlet receiving contaminated effluent from an industrial washing device and a discharge outlet adapted for connection to said washing device for recirculating washing liquid, a continuous flexible filter media spanning the interior of the tank, movably mounted thereon and interposed between said inlet and outlet, a continuous drive means mounted upon said tank and connected to said media, a motor drivingly connected with said drive means, and a pump for continuously pumping filtered liquid from said outlet to said washing device, the liquid passing through said tank having inlet and outlet levels upon opposite sides of said media;

an automatic filter media indexing device comprising a sensor movably mounted upon said tank having a contactor engagable with said filter media on the downstream side thereof;

a normally open switch connected to a power source and to said motor;

a spring biased linkage means interconnecting said sensor and switch normally biasing said sensor against and responsive to deflection of said filter media and for maintaining said switch open;

the differential between said liquid levels increasing to a predetermined level as the media becomes clogged, effecting a proportional deflection of said filter media and causing movement of said sensor closing said switch.

* * * * *